United States Patent [19]

Hilbert et al.

[11] Patent Number: 4,878,744
[45] Date of Patent: Nov. 7, 1989

[54] THREE DIMENSIONAL REFLEX LENS SYSTEMS

[75] Inventors: Robert S. Hilbert, La Canada; Ronald J. Korniski, Glendora, both of Calif.

[73] Assignee: Capitol Records, Inc., Los Angeles, Calif.

[21] Appl. No.: 67,597

[22] Filed: Jun. 26, 1987

Related U.S. Application Data

[62] Division of Ser. No. 814,549, Dec. 30, 1985, Pat. No. 4,688,906.

[51] Int. Cl.[4] .......................... G02B 27/22; G02B 9/64
[52] U.S. Cl. ..................................... 350/447; 350/462
[58] Field of Search ............................... 350/462, 447

[56] References Cited

U.S. PATENT DOCUMENTS

| | | |
|---|---|---|
| 2,341,385 | 2/1944 | Kingslake et al. . |
| 2,821,112 | 1/1958 | Lautenbacher et al. ............ 350/462 |
| 2,846,922 | 8/1958 | Kohler . |
| 2,950,651 | 8/1960 | Kohler et al. . |
| 3,217,598 | 11/1965 | Solisch et al. . |
| 3,257,902 | 6/1966 | Hopkins . |
| 3,348,901 | 10/1967 | Hudson . |
| 3,410,632 | 11/1968 | Woltche . |
| 3,425,775 | 2/1969 | Jacobsen ............................. 352/57 |
| 3,473,866 | 10/1969 | Kirschhoff . |
| 3,495,895 | 2/1970 | Schlegel . |
| 3,531,191 | 9/1970 | Bernier ................................. 352/57 |
| 3,731,989 | 5/1973 | Shimizu . |
| 3,743,388 | 7/1973 | Paukert et al. . |
| 3,883,229 | 5/1975 | Determann et al. . |
| 3,883,230 | 5/1975 | Determann et al. . |
| 3,936,153 | 2/1976 | Ogura . |
| 4,025,155 | 5/1977 | Imai ...................................... 350/447 |
| 4,126,378 | 11/1978 | Ogino . |
| 4,168,882 | 9/1979 | Hopkins ................................ 350/54 |
| 4,178,090 | 12/1979 | Marks et al. ......................... 354/117 |
| 4,182,549 | 1/1980 | Kreitzer . |
| 4,203,653 | 5/1980 | Mori . |
| 4,223,982 | 9/1980 | Sugiyama . |
| 4,235,503 | 11/1980 | Condon ................................ 350/1.2 |
| 4,354,743 | 10/1982 | Mihara ................................ 350/464 |
| 4,448,498 | 5/1984 | Muller et al. ........................ 350/447 |
| 4,518,231 | 5/1985 | Muchel et al. ....................... 350/447 |
| 4,575,195 | 3/1986 | Hoogland ............................ 350/447 |

Primary Examiner—Bruce Y. Arnold
Assistant Examiner—Rebecca D. Gass
Attorney, Agent, or Firm—Sheldon & Mak

[57] ABSTRACT

Optical system for use with attachments for a conventional reflex motion picture camera to permit stereographic cinematography are disclosed. The optical systems include lens systems having four powered elements having negative, positive, negative, and positive focal lengths respectively. The lens systems are adapted to be used with the Bernier stereographic cinematography attachment system as modified for reflex motion cameras. The lens systems include a normal lens system, a wide angle lens system, and a telephoto lens system. The wide angle lens system further includes plane parallel refractive elements to increase its overall length without changing its back focal length, and the telephoto lens system is adapted to be used with internal displacement prisms which bring the images produced by the telephoto lens system into the camera flange opening.

6 Claims, 8 Drawing Sheets

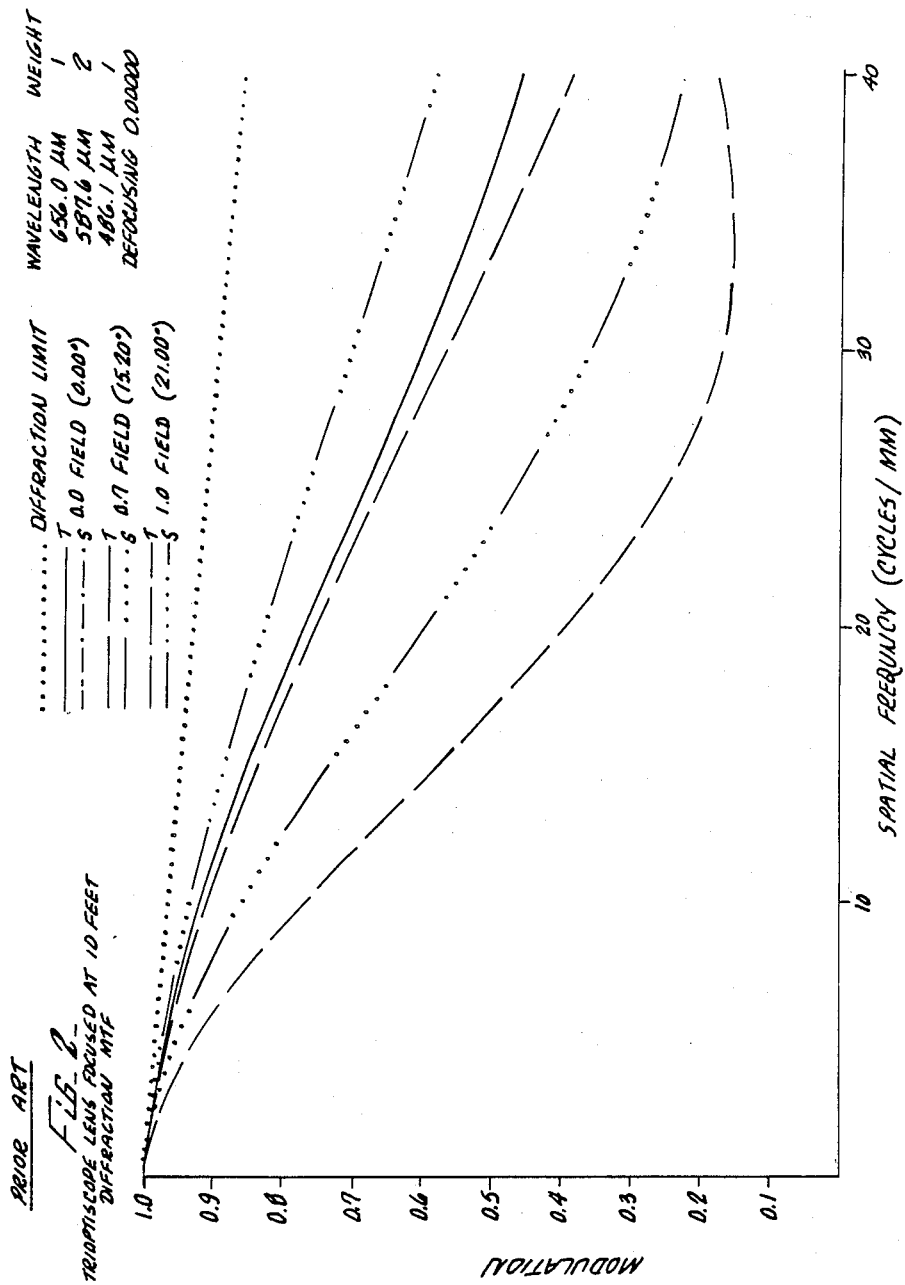

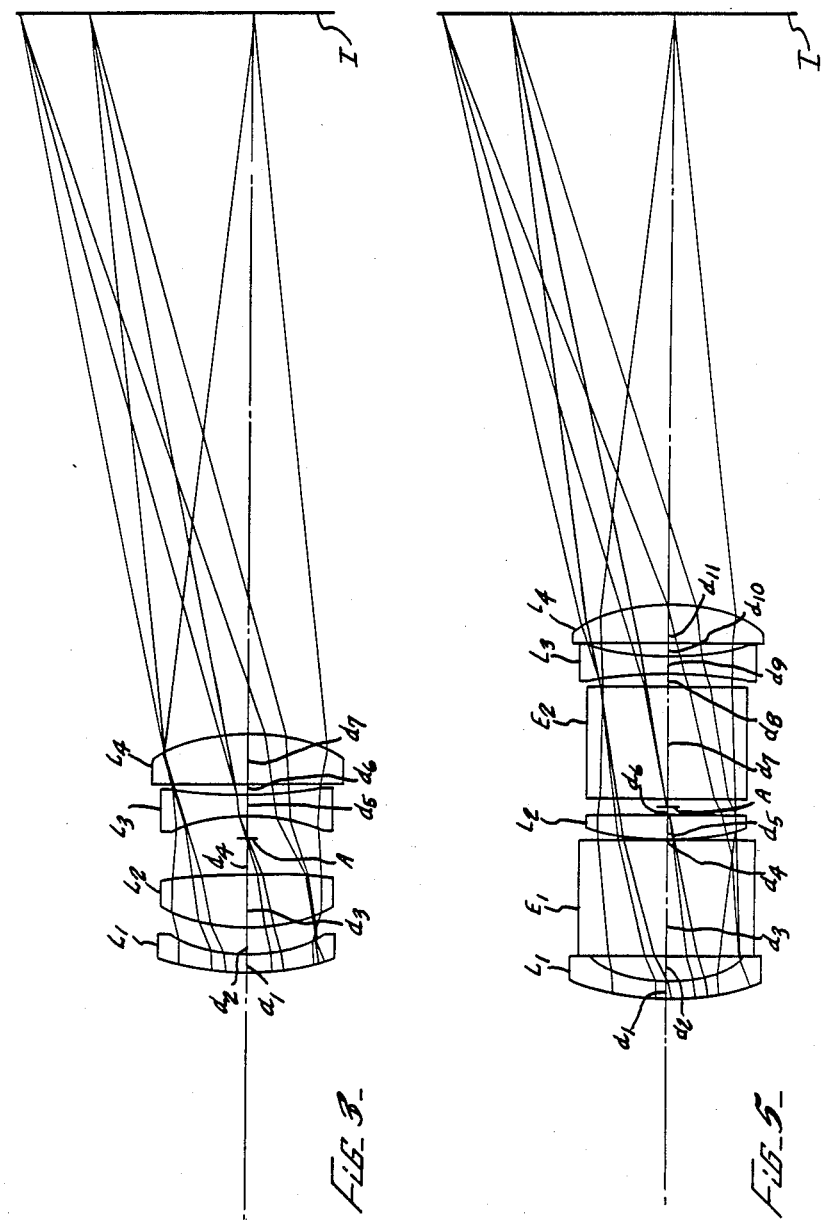

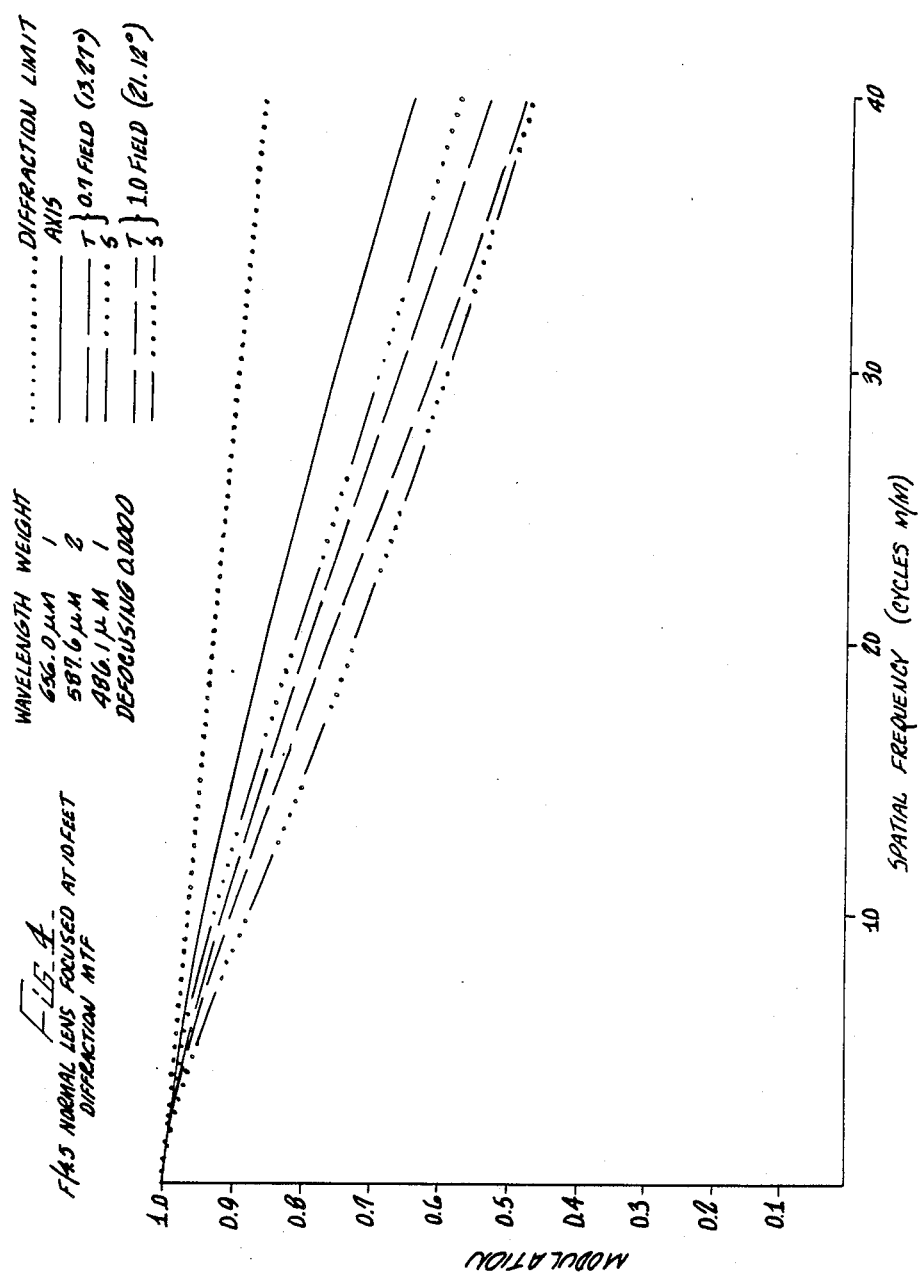

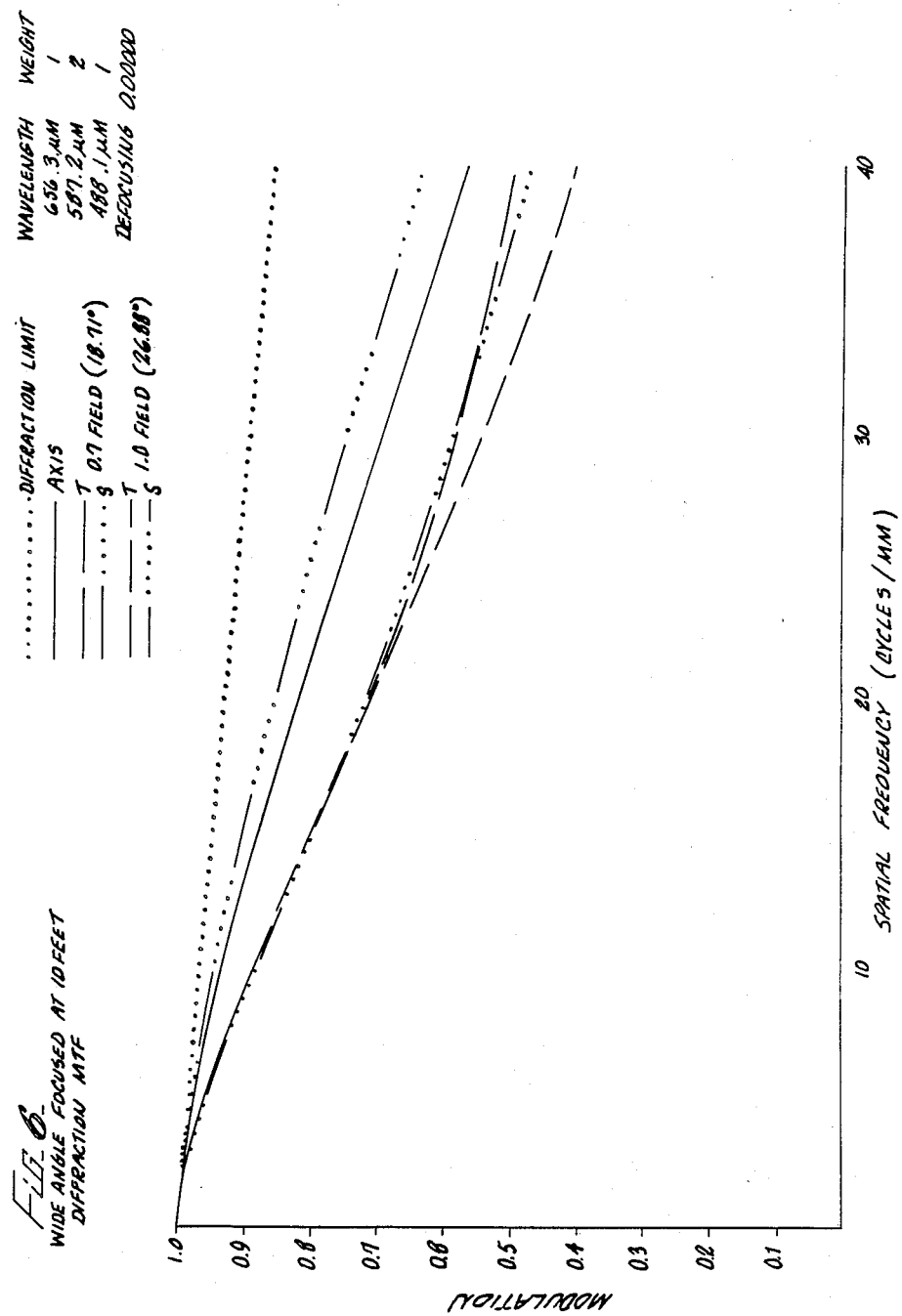

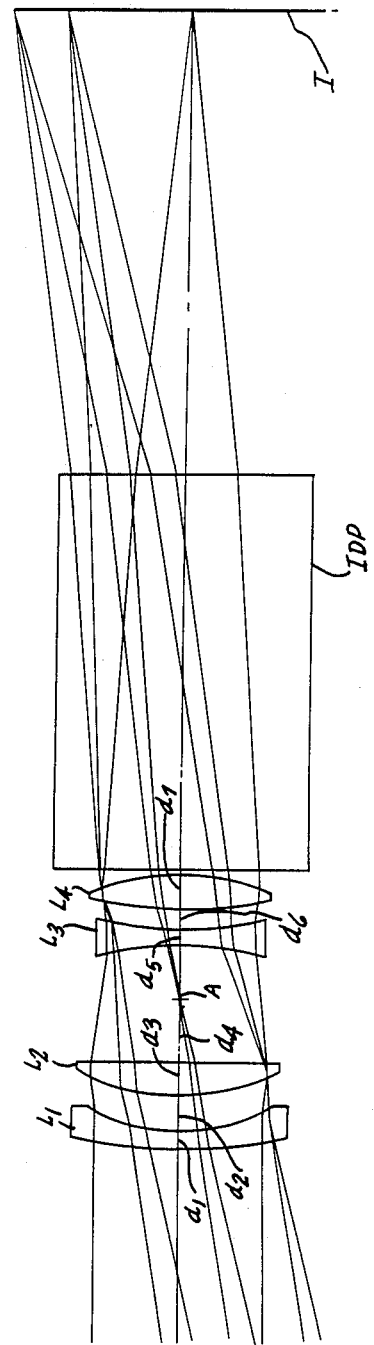

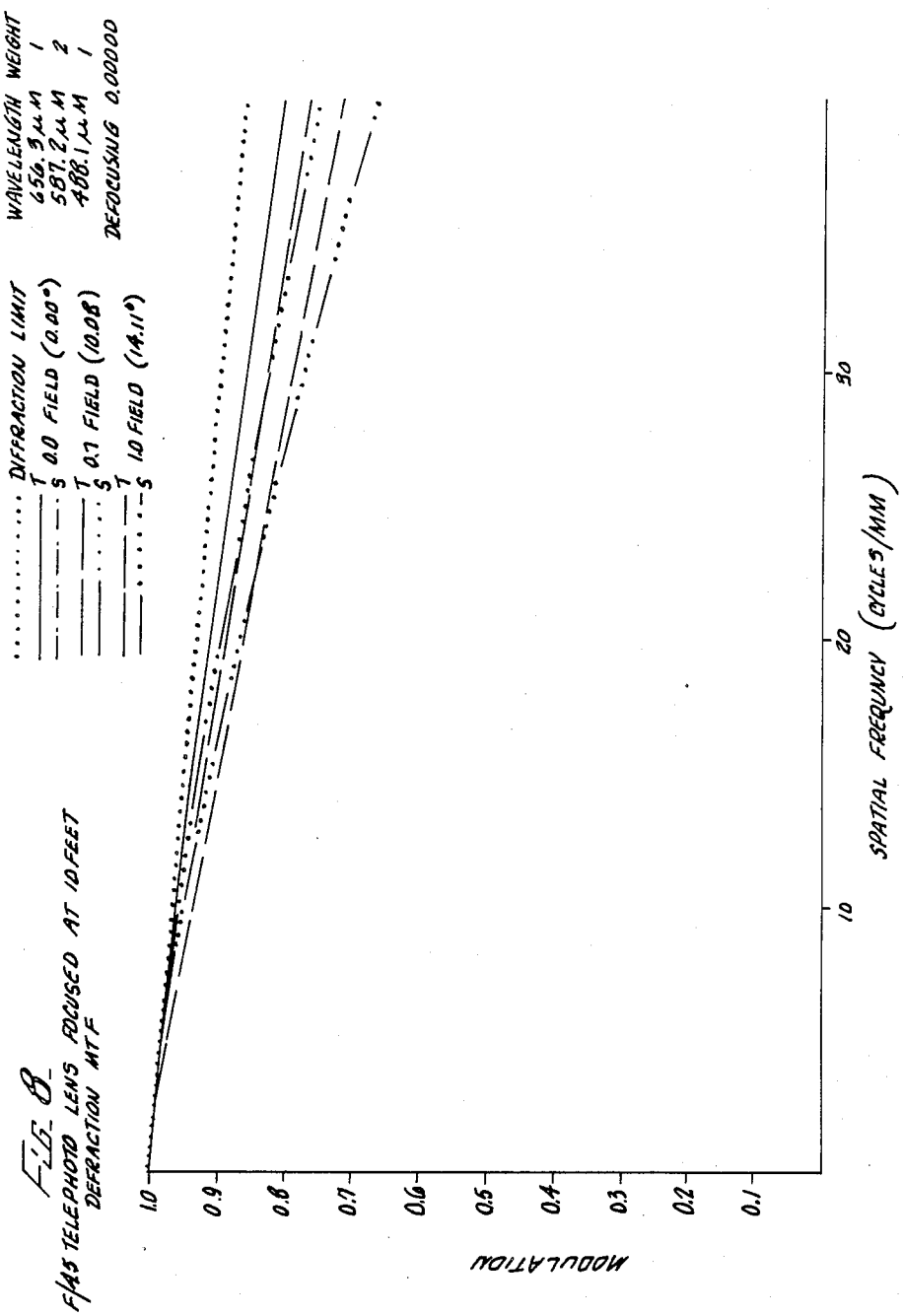

THREE DIMENSIONAL REFLEX LENS SYSTEMS

This is a division of application Ser. No. 814,549, filed Dec. 30, 1985 now U.S. Pat. No. 4,688,906.

BACKGROUND OF THE INVENTION

1. Field of the Invention

This invention relates to photographic lens systems, and more particularly, to lens systems adapted for use in three-dimensional cinematography.

2. Description of the Prior Art

Three dimensional motion picture photography is old in the art. Many devices are known for photographing images from two positions separated by an interocular distance to place right- and left-hand adjacent images onto a frame of a film strip, side-by-side or one above the other. Bernier, U.S. Pat. No. 4,531,191, the disclosure of which is incorporated by reference herein, discloses an attachment for a conventional motion picture camera to permit the filming of stereoscopic images on motion picture film. The images are placed one above the other, rather than side-by-side.

The Bernier attachment comprises a pair of wide angled right and left eye displacement prisms which receive right and left eye images side by side and then transpose these images into vertical relationship on the film. The right and left eye images together occupy the same area on the film normally occupied by a single photographic frame. Immediately behind the prisms and part of the same attachment are two lens systems which gather the right and left eye images and focus them on the film plane. The two lens systems should be of the same equivalent focal length and in focus together so that the right and left eye images are on the same scale. The prisms and the lenses must fit tight packaging constraints in order to be mounted on a conventional motion picture camera. The prisms are folded to clear the flange requirements of the particular camera being used and the lens systems are actually located in the interior of the camera body. The prisms and lens systems of the three dimensional photography attachment must fit in the space normally occupied by a single lens system when the camera is not being used for three-dimensional cinematography.

The Bernier invention provided apparatus for attachment to a conventional motion picture camera such as the Mitchell BNC camera. This camera is a viewfinder camera and is being superseded by reflex motion picture cameras such as the Panaflex, Arriflex and Eclair reflex cameras. In reflex motion picture cameras the cameraman views the scene through the same optical system that projects the image onto the motion picture film, rather than through a separate viewfinder incorporating a completely separate lens system. The cameraman may thus see the scene the film sees and adjust focus and convergence as required. Such cameras present tighter and more exacting packaging problems compared to non-reflex motion picture cameras owing to the space occupied by the reflex mirror and often to smaller camera flange diameters. Thus, both the displacement prisms of the Bernier system and the lenses provided therewith must fit into a smaller space than is the case with the viewfinder Mitchell camera and the like. The reflex mirror requires increased back focal lengths for lenses in reflex cameras. Another factor requiring minimization of the size of the prisms and lenses of the Bernier type optical attachment for use with modern reflex cameras is the weight of the overall system, which should be decreased for greater portability and convenience of use.

The lens system used with non-reflex motion cameras such as the Mitchell BNC is typified by the trioptiscope lens system which has four elements in three groups (the rearmost group consists of two elements cemented together). This lens system is incapable of fitting into the three dimensional photography attachment necessary for reflex motion picture cameras due to mechanical interference with the reflex mirror as well as other portions of the camera. In addition, the lenses provided for use with the Bernier attachment for non-reflex motion picture cameras have not been available in a variety of focal lengths. Three dimensional cinematography would be materially enhanced by the availability of wide angle and telephoto lens systems in addition to normal lens systems. Such lenses should be at least of the quality of the trioptiscope lens provided hitherto in order to be adequate for motion picture photography.

SUMMARY OF THE INVENTION

Accordingly, an object of the present invention is to provide lens systems adapted for use in three dimensional Bernier type photography attachments for reflex cameras.

Another object of the present invention is to provide lens systems of diverse effective focal lengths for use with reflex motion picture cameras in three dimensional cinematography.

A particular object of the present invention is to provide wide angle, telephoto, and normal lens systems for use with reflex motion picture cameras in three dimensional cinematography.

Still another object of the present invention is to provide lens systems for use with reflex motion picture cameras in three dimensional cinematography which are of high optical quality as well as being small in size and low in weight. Other and further objects and advantages will appear hereinafter.

According to the present invention, lens systems are provided which comprise a sequence of a negative lens followed by a triplet lens (a triplet lens is a compound lens composed of three single lens elements). A sequence of four powered single lenses having the following power sequence is preferred; negative, positive, negative, and positive. Two lens systems, mounted parallel and adjacent to each other, comprise a version of the invention adapted for use in three-dimensional photography attachments to reflex cameras.

The invention provides particular lens systems of various effective focal lengths. In particular, a normal lens system, a wide angle lens systems which includes plane parallel refractive elements between the first negative lens and the first positive lens and between the first positive lens and the second negative lens, and a telephoto lens are provided. All of these lens systems allow for the greatest possible distance between the image plane and the first element (through which light passes) of the lens system to minimize the size of the front displacement prisms while also satisfying the large back focal length requirement. In the telephoto version of the invention, internal displacement prisms are provided which transmit images from the telephoto lens system to the image plane through the camera flange entrance.

The invention also may be adapted for use with three-dimensional reflex television cameras. In such cameras the right and left hand images are recorded electronically, rather than on motion picture film. Although this disclosure primarily describes the invention in the context of three-dimensional cinematography, for use with standard reflex motion picture cameras, the invention is not limited to such uses and includes television applications.

The more important features of the invention have been outlined very broadly. Additional features of the invention exist that will be set forth hereinafter in the detailed description of the preferred embodiments.

BRIEF DESCRIPTION OF THE DRAWINGS

Specific embodiments of the invention have been chosen for purposes of illustration and are shown in the accompanying drawings wherein:

FIGS. 3, 5, and 7 are longitudinal sections of the normal lens system, wide angle lens system, and telephoto lens system preferred embodiments of the invention, respectively, with illustrative ray diagrams showing the refraction of light thereby, and FIGS. 4, 6, and 8 are the corresponding modulation transfer function graphs;

DESCRIPTION OF THE PREFERRED EMBODIMENTS

Figure 1:
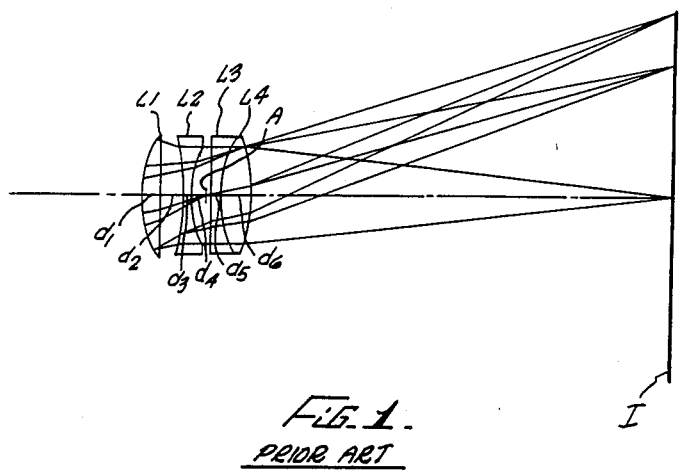
FIG. 1 is a longitudinal section of the trioptiscope lens system of the prior art, with illustrative ray diagrams showing the refraction of light thereby, and FIG. 2 comprises the modulation transfer function curves for this lens system.

The trioptiscope lens system, an example of the prior art, is shown in FIG. 1. Its modulation transfer function curves are shown in FIG. 2. All data presented for the performance of the lens system of FIG. 1 and the lens systems of the present invention include image data on an axis field point, 0.7 of the format corner field point, and the format corner field point. Appendix I contains a table presenting the dimensions and characteristics of the trioptiscope lens focused at infinity, for a 35 mm movie film format.

From the above data and FIG. 1 one may observe that the trioptiscope lens system is composed for four lens elements in three groups, of which the last lens group is a doublet. The three groups have the following power sequence: positive, negative, and positive. The first lens element is convex-planar, the second biconcave and the doublet is a combination of, first, a biconcave, and second, a biconvex lens.

The trioptiscope lens system is compatible with use in viewfinder cameras such as the Mitchell BNC. Modern reflex motion picture cameras, such as the Panavision Panaflex camera, present more stringent interface requirements for lens systems used in Bernier-type three-dimensional cinematography attachments.

The lens systems of the present invention will meet the interface requirements of modern reflex motion picture cameras, used in a three-dimensional cinematography attachment containing two such lens systems adjacent and parallel to each other.

Referring to FIGS. 3, 5, and 7, the lens systems of the preferred embodiments of the invention comprise four single lenses $L_1$–$L_4$ having spherical surfaces, sequentially arranged in the direction of travel of light through the lens system from object to image plane I. FIG. 3 shows a normal lens system embodiment of the invention, FIG. 5 a wide angle lens system embodiment, and FIG. 7 a telephoto lens system embodiment. The first lens $L_1$ is a meniscus lens of negative focal length with its convex surface facing the object. The second lens $L_2$ is a biconvex lens for the normal and wide angle lens systems or a meniscus lens of positive focal length for the telephoto lens system, with at least one surface convex to the object side of the lens system. The third lens $L_3$ is a biconcave lens of negative focal length. The fourth lens $L_4$ is a biconvex lens for the telephoto lens system, or, for the normal and wide angle lens systems, a meniscus lens of positive focal length with its surfaces convex to the film or image plane I.

Figure 10:
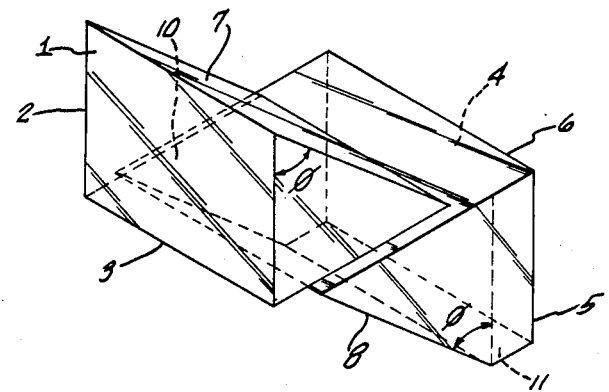
FIG. 10 is an oblique perspective view of an internal displacement prism used with the telephoto lens system of the present invention.
Figure 9:
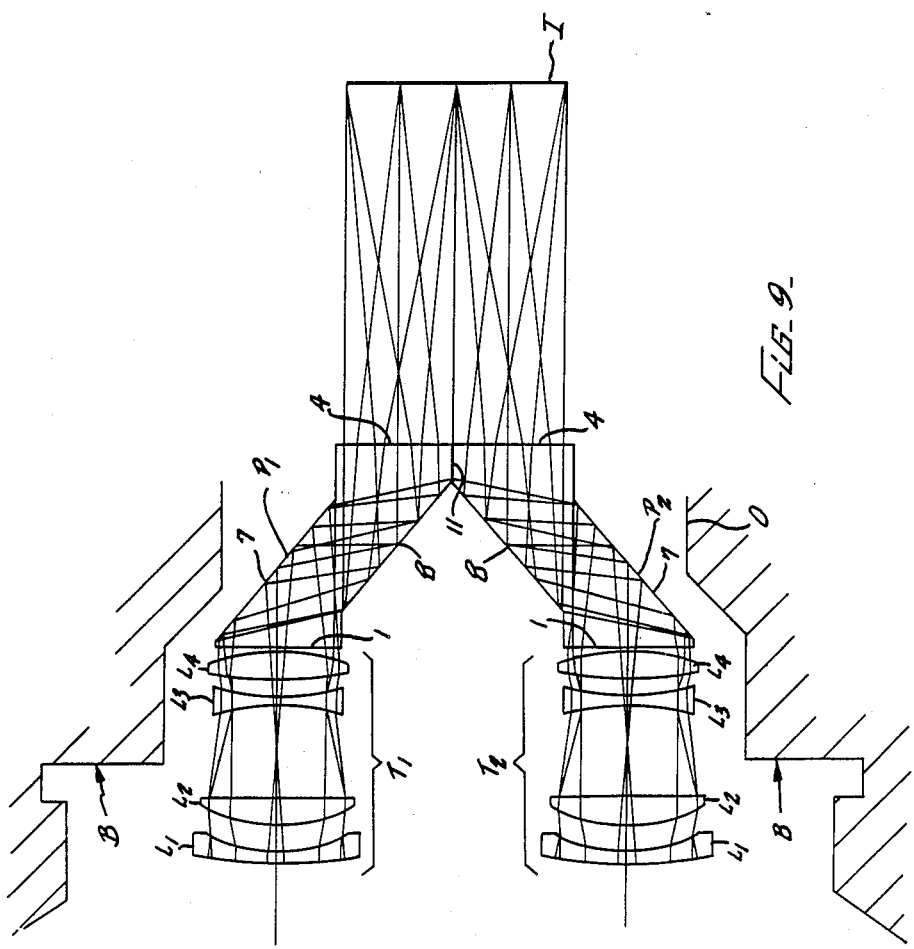
FIG. 9 is a longitudinal section of two telephoto lens systems mounted in parallel allied with internal displacement prisms, in the general arrangement required by the Bernier system.

Two such lens systems are mounted in parallel and adjacent to each other to form the overall lens system needed for three dimensional cinematography in a reflex motion picture camera. The particular dimensions, indices of refraction, separations, and alignment of the single lens elements produce normal, wide angle or telephoto lens systems. (The telephoto lens system of the present invention is actually an inverted telephoto lens system but will be referred to as a telephoto system for convenience.) Plane parallel refractive optical elements $E_1$ and $E_2$ are provided in the wide angle lens system of the present invention, FIG. 5, to maximize the distance from the forward (forward referring to the location closest to the object) lens element to the image plane I while minimizing the lens element diameters. In addition, because of the large overall width of the telephoto lens system and its mounting, internal displacement prisms, shown in FIGS. 9 and 10, are used for bringing the right and left eye images within the camera flange opening for superposition at the correct lateral separation upon the film. All air-glass surfaces preferably are provided with magnesium fluoride or other anti-reflection coatings.

In FIGS. 3, 5, and 7 the letters $d_1, d_2, \ldots d_i$ indicate axial separations between successive refracting surfaces. The same symbology is used with respect to lens elements in FIG. 1, which shows the trioptiscope lens system.

The same or substantially similar optical results for the three dimensional photography attachment preferred embodiments presented herein may be obtained with variations of the four powered element designs used for the lens systems. The four powered element lens system design is the simplest configuration, with the fewest number of powered elements. Other lens configurations, with the same basic optical theme, could be used to obtain the basic results of this invention.

The inverted telephoto designs for the normal, wide, and telephoto lens preferred embodiments of the invention presented herein may be described as a triplet lens (elements two through four) preceded by a negative lens (first element). Variations of this theme would be inverted telephoto lenses that employ hybrid triplet lenses after the first negative lens; or compound (split) negative elements before the triplet lens; or both:

(A) The simplest variation would be a negative element followed by a triplet hybrid known as a Tessar (the Tessar triplet is actually a four element lens systems in which the two rear elements are cemented together to form a dual component combinations len). This would be a five element lens system having the following power arrangement: negative, positive, negative, negative, and positive.

(B) Another arrangement would be a negative element followed by the triplet hybrid known as a Pentac-Heliar (the Pentac-Heliar triplet is actually a five element lens system in which the two front elements and the two rear elements are cemented together, respectively, to form two dual component combination lenses flanking a single negative power lens element). This would be a six element lens system having the following power arrangement: negative, positive, negative, negative, negative, and positive.

(C) Another simple variation would be splitting the negative element into two weak negative elements (either cemented together or not) followed by the triplet configuration. This would be a five element lens system having the following power arrangement: negative, negative, positive, negative, and positive.

Other variations would be combinations of situations A, B, and C as described above; or with the various doublet groups uncemented.

All of these basic variations have the potential of achieving imagery the same as or better than the four element lens system designs, while also fitting the flange requirements of today's reflex motion picture cameras with nearly the same or more total weight of the four element lens system design preferred embodiments presented herein. Reasons to design the lens systems according to the variations would be to obtain even better image quality; or to make them faster; or to avoid the high index glasses used in the four element lens systems of the preferred embodiments presented herein. Although the lens systems of the preferred embodiments are combinations of four single lens powered elements, the invention is understood to not be limited to the use of single lens powered elements, but may include the use of equivalent compound or multi-component lens powered elements in place of single lens powered elements.

FIG. 3 depicts the normal lens system preferred embodiment of the present invention and FIG. 4 shows its modulation transfer function curves. The higher modulation transfer function of the normal lens system of the present invention, compared to the trioptiscope lens system, means that better image quality will result.

Parameters of the normal lens system preferred embodiment (FIG. 3) of the present invention, compatible with a 35 mm moving film format, are given in the following table:

| F/4.5 Normal lens Focused at Infinity | | | | | | |
|---|---|---|---|---|---|---|
| Element | $R_1$ | $R_2$ | d | $CA_1$ | $CA_2$ | GLASS |
| 1 | 15.700 | 7.269 | .750 | 7.800 | 7.044 | LASF |
|  |  |  | 1.443 |  |  |  |
| 2 | 9.357 | −35.989 | 2.650 | 7.583 | 7.540 | SF7 |
|  |  |  | 1.880 |  |  |  |
|  | APERTURE STOP |  |  | 7.167 |  |  |
|  |  |  | 1.086 |  |  |  |
| 3 | −11.109 | 37.501 | 1.250 | 7.076 | 7.501 | SF57 |
|  |  |  | .542 |  |  |  |
| 4 | −69.872 | −9.044 | 2.650 | 7.647 | 8.500 | LASF5 |
|  |  |  | 36.066 |  |  |  |
| IMAGE |  |  | FLAT | 23.941 |  |  |

EFL = 31.600
BFL = 36.066
FFL = −19.084
F/No − 4.500
OAL = 12.254
SEMI-FIELD ANGLE = 20.748°

-continued

| F/4.5 Normal lens Focused at Infinity |
|---|
| ENTRANCE PUPIL |
| DIAMETER = 7.022 |
| DISTANCE = 5.031 |
| EXIT PUPIL |
| DIAMETER = 9.201 |
| DISTANCE = −5.341 |

(Dimensions are given in millimeters. Definitions of the symbols used for this and subsequent lens prescription tables will be found in Appendix I.)

The normal lens system embodiment of the present invention has an f-number of 4.5 and an effective focal length of 32 millimeters in the 35 mm moving film format. Mechanical variation of the stop diameter, provided at the aperture stop, will allow variation of f-number from no faster than f/4.5 down to whatever slower f-number is desired and mechanically designed into the lens. In the table presented in Appendix II, the critical dimensions and other characteristics of the normal lens system of the present invention are compared to the trioptiscope lens system of the prior art, which is also an f/4.5, 32 millimeter effective focal length lens system. "Prism" refers to the Bernier displacement prism of "external displacement prism" as it will be called hereinafter; interocular separation, also known as stereo base, refers to the ocular separation of the image forming light received by the two entrance faces of the external displacement prisms, which is responsible for the ultimate three-dimensional effect.

The lens systems of the present invention may also be scaled for use in other format reflex cameras such as the 65 mm movie film format.

Scaling up affects the pulldown (the amount of film drawn down in front of the lens systems for a single exposure) and the intraocular distance.

The normal framing aspect ratio of width to height of the picture frame for a typical 35 mm reflex motion picture camera, used with lens systems of the present invention, is 2.36:1 for both channels. The 35 mm camera aperture dimensions are 0.735×0.868 inch for the height and width, respectively. Although the 35 mm format lens system design of the present invention may be easily scaled for use with 65 mm motion picture cameras, resolvable difficulties arise in achieving the same effective wide screen image. The most common 65 mm cameras use five perforation pulldown (perforations referring to the apertures in the sides of the film strip). However, a ten perforation pulldown camera needs to be used in order to achieve the same projected effective wide screen image for theater viewing while exploiting the available film width. The 65 mm ten perforation pulldown camera would use a 1.81×2.07 inch height and width camera aperture on which to record both channels. This would yield a framing aspect ratio similar to that of the 35 mm system, namely 2.29:1. The height could then be matted down to use 97% of the camera aperture area to exactly match the 35 mm framing aspect ratio of 2.36:1.

In scaling the lens systems of the present invention to the 65 mm three-dimensional motion picture application, the interocular distance also scales. If left at the scaled value, this situation would yield an enhanced stereoscopic effect upon viewing a picture in a theater when compared with the scene taken with the 35 mm camera lens covering the same field of view. This need not be the case since the interocular distance could be designed (via external displacement prism design modification) to be the same as for the 35 mm camera, or nearly so, depending on the selection of the appropriate ten perforation camera and/or modified ten perforation camera. This would also mean that the external displacement prisms for 65 mm camera use would not be constructed according to the scaled-up design of a sealed 35 mm camera external displacement prism, although the concept would be identical. Redesign of the external displacement prisms will not alter the field of the view of the camera; narrowing the interocular separation through redesign of the external displacement prisms will also not narrow the field of view.

As example of a lens prescription that could be used for 65 mm filming is given in the table below, in which length dimensions are given in millimeters. This lens would have a 75.4 mm focal length and cover a total field of 41.5 degrees (the same field of view as the 35 mm camera case). The purely scaled Bernier external displacement prisms would have all the linear dimensions of the 35 mm camera version scaled by times 2.39; the angular dimensions would be the same. The scaled interocular distance would be 155 mm but could be made to be the 35 mm camera value of 65 mm depending on modification of the filming camera to accept the redesigned prisms for the 65 mm camera format.

| f/4.5 Normal Lens Infinite Focus; 65 mm Format | | | | | | |
|---|---|---|---|---|---|---|
| Element | $R_1$ | $R_2$ | d | $CA_1$ | $CA_2$ | GLASS |
| 1 | 37.478 | 17.353 | 1.790 | 18.711 | 16.887 | LASF5 |
|   |        |        | 3.446 |        |        |       |
| 2 | 22.336 | −85.906 | 6.325 | 18.381 | 18.065 | SF7 |
|   |        |        | 4.489 |        |        |     |
|   | APERTURE STOP | | 2.594 | 17.107 | | |
| 3 | −26.517 | 89.515 | 2.983 | 16.886 | 17.893 | SF57 |
|   |         |        | 1.295 |        |        |      |
| 4 | −166.785 | −21.589 | 5.325 | 18.270 | 20.338 | LASF5 |
|   |          |         | 85.728 |       |        |       |
| IMAGE |    |     | FLAT | 58.650 | | |

EFL = 75.429
BFL = 86.090
FFL = −45.554
F/N = 4.500
IMAGE DIST = 85.728
OAL = 29.250
SEMI-FIELD ANGLE = 21.244°
ENTRANCE PUPIL
DIAMETER = 16.762
DISTANCE = 12.009
EXIT PUPIL
DIAMETER = 21.964
DISTANCE = −12.749

The normal lens system preferred embodiments of the present invention, discussed above, may be described in terms of dimensionless lens prescriptions by dividing all lengths by the effective focal length and multiplying by 100. The table below gives the dimensionless lens prescriptions obtained thereby.

| Effective focal length = 100.0, f/4.5, semi-field angle = 20.7° back focal length = 114.1 aperture stop located 5.95 behind second lens | | | | |
|---|---|---|---|---|
| Lens | $R_1$ | $d_i$ | $n_i$ | $\nu_i$ |
| $L_1$ | $R_1$ = 49.7 | $d_1$ = 2.37 | $n_1$ = 1.8807 | $\nu_1$ = 41.01 |
|       | $R_2$ = 23.0 | $d_2$ = 4.57 | Airspace | |
| $L_2$ | $R_3$ = 29.6 | $d_3$ = 8.39 | $n_2$ = 1.6398 | $\nu_2$ = 34.61 |
|       | $R_4$ = −113.9 | $d_4$ = 22.42 | Airspace | |
| $L_3$ | $R_5$ = −35.2 | $d_5$ = 3.96 | $n_3$ = 1.8467 | $\nu_3$ = 23.83 |
|       | $R_6$ = 118.7 | $d_6$ = 1.72 | Airspace | |
| $L_4$ | $R_7$ = −221.1 | $d_7$ = 8.39 | $n_4$ = 1.8807 | $\nu_4$ = 41.01 |
|       | $R_8$ = −28.6 | | | |

(Where $L_1$, $L_2$, $L_3$, and $L_4$ represent the first to fourth single lenses, respectively, the distance the aperture stop is located behind the second lens $L_2$ is the axial separation between the aperture stop and the surface of $L_2$ nearest the image side of the lens system, $R_1$, $R_2$, . . . $R_8$ represent the radii of curvature of the respective lens surfaces; $d_1$, $d_2$, . . . $d_7$ represent the axial separations between consecutive refracting surfaces; $n_1$, $n_2$, . . . $n_4$ represent the refractive indexes of each lens for D-line of sodium; and $\nu_1$, $\nu_2$, . . . $\nu_4$ are the Abbe numbers of the respective single lenses.)

The lens system of the present invention is capable of being adapted to have different focal lengths, yet still be accommodated successfully in modern reflex motion picture cameras having different film formats.

The wide angle lens system preferred embodiment of the invention is depicted in FIG. 5 and its modulation transfer function curves are shown in FIG. 6. The plane parallel refractive elements $E_1$ and $E_2$ are formed of high index, low dispersion glass in order to physically lengthen the lens system yet retain excellent image quality. Lengthening the lens is essential to maximizing the entrance pupil to film distance despite the short focal length.

Parameters of the wide angle lens system preferred embodiment of the present invention, for a 35 mm movie film format, are given in the following table:

| F/4.5 Wide Angle Focused at Infinity | | | | | | |
|---|---|---|---|---|---|---|
| Element | $R_1$ | $R_2$ | d | $CA_1$ | $CA_2$ | GLASS |
| 1 | 15.463 | 7.073 | .7500 | 8.418 | 7.600 | LASF5 |
|   |        |       | 1.4259 |      |       |       |
| 2 | INFINITY | INFINITY | 5.4972 | 7.555 | 7.147 | LASF5 |
|   |          |          | .2500  |       |       |       |
| 3 | 14.612 | −57.679 | 1.2802 | 7.051 | 6.969 | LASF9 |
|   |        |         | .3750  |       |       |       |
|   | APERTURE STOP | | | 6.905 | | |
|   |               | | .375  |       | | |
| 4 | INFINITY | INFINITY | 5.6148 | 6.854 | 6.678 | LASF5 |
|   |          |          | .5329  |       |       |       |
| 5 | −25.717 | 20.667 | 1.0000 | 6.856 | 7.548 | SF57 |
|   |         |        | .6749  |       |       |      |
| 6 | −397.296 | −9.758 | 1.7281 | 7.985 | 8.520 | LAK17 |
|   |          |        | 29.9800 |      |       |       |
| IMAGE |   |   | FLAT | 23.9418 | | |

EFL = 24.000
BFL = 29.980
FFL = −10.207
F/No = 4.500
OAL = 19.503
SEMI-FIELD ANGLE = 26.509
ENTRANCE PUPIL

-continued

| F/4.5 Wide Angle Focused at Infinity |
|---|
| DIAMETER = 5.333 |
| DISTANCE = 4.761 |
| EXIT PUPIL |
| DIAMETER = 8.551 |
| DISTANCE = −8.500 |

A dimensionless lens system prescription for the above wide angle lens system preferred embodiment of the present invention (in terms of multiples of the effective focal length multiplied in turn by 100) is given below.

Effective focal length = 100.0 f/4.5 back focal length = 124.9
semi-field angle = 26.5°
aperture stop located 1.56 behind second lens

| Element | $R_i$ | $d_i$ | $n_i$ | $\nu_i$ |
|---|---|---|---|---|
| $L_1$ | $R_1 = 64.4$ | | | |
| | | $d_1 = 3.12$ | $n_1 = 1.8807$ | $\nu_1 = 41.01$ |
| | $R_2 = 29.5$ | | | |
| | | $d_2 = 5.94$ | Airspace | |
| | $R_3 = $ infinity | | | |
| $E_1$ | | $d_3 = 22.91$ | $n_2 = 1.8807$ | $\nu_2 = 41.01$ |
| | $R_4 = $ infinity | | | |
| | | $d_4 = 1.04$ | Airspace | |
| | $R_5 = 60.9$ | | | |
| $L_2$ | | $d_5 = 5.33$ | $n_3 = 1.8503$ | $\nu_3 = 32.23$ |
| | $R_6 = -240.3$ | | | |
| | | $d_6 = 3.13$ | Airspace | |
| | $R_7 = $ infinity | | | |
| $E_2$ | | $d_7 = 23.40$ | $n_4 = 1.8807$ | $\nu_4 = 41.01$ |
| | $R_8 = $ infinity | | | |
| | | $d_8 = 2.22$ | Airspace | |
| | $R_9 = -107.2$ | | | |
| $L_3$ | | $d_9 = 4.17$ | $n_5 = 1.8467$ | $\nu_5 = 23.83$ |
| | $R_{10} = 86.1$ | | | |
| | | $d_{10} = 2.81$ | Airspace | |
| | $R_{11} = -1655.4$ | | | |
| $L_4$ | | $d_{11} = 7.20$ | $n_6 = 1.7885$ | $\nu_6 = 50.48$ |
| | $R_{12} = -40.7$ | | | |

(Where $L_1$, $L_2$, $L_3$, and $L_4$ represent the first to fourth single lenses, respectively, $E_1$ and $E_2$ represent the plane parallel refractive elements, the distance the aperture stop is located behind the second lens $L_2$ is the axial separation between the aperture stop and the surface of $L_2$ nearest the image side of the lens system, $R_1$, $R_2$, . . . $R_{12}$ represent the radii of curvature of the respective lens and element surfaces, $d_1$, $d_2$, . . . $d_{11}$ represent the axial separations between consecutive lens and element surfaces, $n_1$, $n_2$, . . . $n_6$ represent the refractive indexes of each lens or element for D-line of sodium, and $\nu_1$, $\nu_2$, . . . $\nu_6$ are the Abbe numbers of the respective lenses or elements.)

The telephoto lens system preferred embodiment of the invention is depicted in cross-section in FIG. 7 and its modulation transfer function curves are shown in FIG. 8. The telephoto lens system is more precisely called an inverted telephoto lens system; it is used for long views and to create a narrow field of view. In FIG. 7 the internal replacement prism is illustrated by the slab of glass indicated as IDP. This slab represents the unfolded internal displacement prism pertinent to this lens system. The lens system is designed to compensate for the effects of having this amount of glass following the lens system. An internal displacement prism is represented, as it actually appears, in FIG. 10.

Parameters of the telephoto lens system preferred embodiment, plus an associated internal displacement prism or IDP, for the 35 mm movie film format, are given in the following table. (The internal displacement prism will be discussed in greater detail later.)

| F/4.5 Telephoto Focused At Infinity | | | | | | |
|---|---|---|---|---|---|---|
| Element | $R_1$ | $R_2$ | d | $CA_1$ | $CA_2$ | GLASS |
| 1 | 44.014 | 12.770 | 1.000 | 12.601 | 11.750 | FK5 |
| | | | 2.385 | | | |
| 2 | 14.331 | 162.200 | 2.068 | 11.808 | 11.640 | LAFN2 |
| | | | 4.247 | | | |
| | APERTURE STOP | | | 10.507 | | |
| | | | 3.497 | | | |
| 3 | −22.416 | 20.067 | 1.000 | 9.696 | 9.778 | SF4 |
| | | | 1.426 | | | |
| 4 | 35.940 | −17.878 | 2.070 | 10.360 | 10.556 | LAFN2 |
| | | | 45.983 | | | |
| | | | 0.500 | | | |
| IDP | INFINITY | INFINITY | 25.600 | 10.900 | 14.875 | SF10 |
| | | | 30.570 | | | |
| IMAGE | | | FLAT | 23.9418 | | |

EFL = 50.000
BFL = 30.570
FFL = −37.218
F/No = 4.500
OAL = 17.694
SEMI-FIELD ANGLE = 13.464°
ENTRANCE PUPIL
DIAMETER = 11.111
DISTANCE = 8.540
EXIT PUPIL
DIAMETER = 12.140
DISTANCE = −8.650

A dimensionless lens system prescription for the above telephoto lens system embodiment of the present invention and an associated internal displacement prism (in terms of multiples of the effective focal length, f, multiplied in turn by 100) is given below.

Effective focal length = 100.0
F/4.5 semi-field angle = 13.5°
back focal length = 61.1
aperture stop located 8.49 behind second lens

| Lens | $R_i$ | $d_i$ | $n_i$ | $\nu_i$ |
|---|---|---|---|---|
| $L_1$ | $R_1 = 88.0$ | | | |
| | | $d_1 = 2.0$ | $n_1 = 1.4875$ | $\nu_1 = 70.41$ |
| | $R_2 = 25.5$ | | | |
| | | $d_2 = 4.8$ | Airspace | |
| | $R_3 = 28.7$ | | | |
| $L_2$ | | $d_3 = 4.1$ | $n_2 = 1.7440$ | $\nu_2 = 44.77$ |
| | $R_4 = 324.4$ | | | |
| | | $d_4 = 15.5$ | Airspace | |
| | $R_5 = -44.8$ | | | |
| $L_3$ | | $d_5 = 2.0$ | $n_3 = 1.7552$ | $\nu_3 = 27.58$ |
| | $R_6 = 40.1$ | | | |
| | | $d_6 = 2.9$ | Airspace | |
| | $R_7 = 71.9$ | | | |
| $L_4$ | | $d_7 = 4.1$ | $n_4 = 1.7440$ | $\nu_4 = 44.77$ |
| | $R_8 = -35.8$ | | | |
| | | $d_8 = 1.0$ | Airspace | |
| | $R_9 = $ INFINITY | | | |
| IDP | | $d_9 = 51.2$ | $n_{IDP} = 1.7282$ | $\nu_{IDP} = 28.41$ |
| | $R_{10} = $ INFINITY | | | |

(Where $L_1$, $L_2$, $L_3$, and $L_4$ represent the first to fourth single lenses, IDP represents the internal displacement prism, the distance the aperture stop is located behind the second lens $L_2$ is the axial separation between the aperture stop and the surface of $L_2$ nearest the image side of the lens system, $R_1$, $R_2$, . . . $R_8$ represent the radii of curvature of the respective lens surfaces $R_9$ and $R_{10}$ represent the radii of curvature of the IDP entrance and exit faces, respectively, $d_1, d_2, \ldots d_9$ represent the axial separations between consecutive refracting surfaces, $n_1, n_2, \ldots n_4$ represent the refractive indexes of each single lens for D-line of sodium, $n_{IDP}$ represents the refractive index of the IDP, $\nu_1, \nu_2, \ldots \nu_4$ are the Abbe numbers of the respective single lenses, and $\nu_{IDP}$ is the Abbe number of the IDP.)

The telephoto lens system preferred embodiment of the present invention has an entrance pupil larger than may be accommodated within the reflex camera flange opening when the lens system is placed as it usually is in the Bernier mechanism; therefore it is used with internal displacement prisms in the arrangement shown in FIG. 9, which is a cross-section along a vertical plane (which is the plane at right angles to the image plane). FIG. 9 shows how internal displacement prisms $P_1$ and $P_2$ gather light from the two telephoto lens systems $T_1$ and $T_2$ and pass it backwardly and inwardly within camera flange opening O. This is illustrated by ray diagrams in FIG. 9 which culminate at image plane I within the camera. B indicates the mount within which the three-dimensional cinematography attachment is contained, which generally resembles an open cone with ledges inside as seen by eye from the front of the camera, but in the cross-section of FIG. 9 resembles two stepped sides of a triangle. The term "backwardly" refers to the general direction from lens systems to film plane within the camera; "inwardly" means towards an axis parallel to and directly between the axes of the two lens systems.

The external displacement prisms of the Bernier three-dimensional cinematography arrangement are not shown in FIG. 9 but would be to the left in FIG. 9 (reference should be made to FIGS. 2 and 10 of Bernier, U.S. Pat. No. 3,531,191). The parallel and adjacent alignment of the two telephoto lens systems is characteristic of the Bernier arrangement; the wide angle and normal lens systems of the present invention are disposed likewise when used in three-dimensional cinematography.

FIG. 10 depicts a single internal displacement prism for use with the telephoto lens system preferred embodiment of the present invention. The internal displacement prism has an entrance face 1 and an exit face 4 with heights 2, 5 and widths 3, 6 respectively. The entrance and exit faces are flat. The internal displacement prism has first and second reflection faces 7 and 8 which are oriented at an angle $\theta$ with respect to the planes of the entrance and exit faces 1 and 4 (which are themselves parallel). Reflection faces 7 and 8 cause light rays entering entrance face 1 to be displaced axially (or inwardly, as is best seen in FIG. 9) upon leaving exit face 4. The particular internal displacement prism shown in FIG. 10 is a compound prism, formed by joining two simpler prisms at a face 10 by cementing. Also, prism surfaces other than those used by the intended light path are fine ground plus have opaque coatings to help suppress stray light.

The internal displacement prisms will be in contact with each other at faces 11 (see FIG. 9) when placed within the camera flange opening. This will necessitate a small amount (<5%) of additional vignetting on the film, on the sides of the frames common to both channels (i.e., common to right and left hand images).

The following table gives an example of the dimensions of such an internal displacement prism adapted for use with the telephoto lens system of the previous example, for a 35 mm movie film format.

| Internal Displacement Prism | |
|---|---|
| Parameter | Value |
| Entrance Face, H × W | 10.5 mm × 14.0 mm |
| Exit Face, H × W | 9.56 mm × 15.5 mm |
| Total Axial Displacement | 10.15 mm |
| Maximum Lower Half Exit Face Aperture Height | 4.6 mm |
| Reflection Face Orientation ($\theta$) | 50.0° |
| Glass | 728284 |

The normal lens system, wide angle lens system, and telephoto lens system preferred embodiments of the present invention, for 35 mm movie film format, are summarized and compared in the table of Appendix III.

The external displacement prisms are smaller and lighter than those used with lens systems of the prior art, but vary in dimension and interocular separation according to the focal length of the lens system. The external displacement prisms for the normal and wide angle lenses are made of 728284 glass and the telephoto prisms are made of the present invention. A pure scaling up of the wide angle and telephoto external displacement prism designs intended for 35 mm format cameras would result in 65 mm versions having interocular separations of 119 mm and 243 mm for the wide angle and telephoto lens systems, respectively. The same considerations regarding effective wide screen angle, framing aspect ratio, and pulldown would apply as for the normal lens system scale-up.

The wide angle and telephoto lens systems of the present invention further embody unusual geometry in order to achieve the tight packaging goals necessary. These goals are accomplished by incorporation of the following concepts:

A. For the wide angle:
1. An approximately f/4.5 objective lens system;
2. With back focal length greater than or equal to 1.16 effective focal length;
3. Covering a 26° or greater semi-field;
4. With four or more optical elements;
5. With a maximum clear aperture diameter no larger than 60% greater than the entrance pupil diameter;
6. With corner illumination greater than 40%; and
7. Having a sum of axial glass thicknesses over 80% of the total length from front vertex to back vertex.

B. For the telephoto lens:
1. An approximately f/4.5 objective lens system;
2. With back focal length 80% of the effective focal length;
3. Covering a 13.5° or greater semi-field;
4. Having four or more optical elements;
5. With maximum clear aperture no larger than 115% of the entrance pupil diameter;
6. Having corner illumination greater than 40%; and
7. With an overall length from front vertex to back of less than 38% of the effective focal length.

| APPENDIX I | | | | | | |
|---|---|---|---|---|---|---|
| Trioptiscope Lens Focused at Infinity | | | | | | |
| Element | $R_1$ | $R_2$ | d | $CA_1$ | $CA_2$ | GLASS |
| 1 | 7.800 | INFINITY | 1.240 | 7.000 | 7.000 | 57357 |
| | | | 1.320 | | | |
| 2 | −19.690 | 7.300 | .510 | 6.300 | 6.300 | 58041 |

APPENDIX I
Trioptiscope Lens Focused at Infinity

|   |         | 1.130         |       |       |       |       |
|---|---------|---------------|-------|-------|-------|-------|
|   |         | APERTURE STOP | 6.025 |       |       |       |
|   |         |          .420 |       |       |       |       |
| 3 | −72.720 |         7.000 |  .510 | 6.300 | 6.300 | 52952 |
| 4 |   7.000 |       −12.260 | 1.910 | 6.300 | 6.300 | 61754 |
|   |         |        27.816 |       |       |       |       |
| IMAGE | | INFINITY      |       | 23.942 |      |       |

EFL = 31.637
BFL = 27.816
FFL = −28.841
F/No = 4.503
OAL = 7.040
SEMI-FIELD ANGLE = 20.726°
ENTRANCE PUPIL
DIAMETER = 7.027
DISTANCE = 4.559
EXIT PUPIL
DIAMETER = 6.656

APPENDIX I
Trioptiscope Lens Focused at Infinity

DISTANCE = −2.151

(EFL—effective focal length; BFL=back focal length; FFL=forward focal length; OAL=overall length of the lens system along the optical axis, from first to last refracting surface; $R_1$ is the first radius of the element; $R_2$ the second radius; d is the axial separation between successive lens surfaces or between a lens surface and the aperture step; $CA_1$ is the clear aperture of the first surface of a lens; $CA_2$ is the clear aperture of the second surface of a lens; dimensions are given in millimeters; a positive radius indicates the center of curvature is to the image side of the lens system; negative radius indicates the center of curvature is to the object side of the lens system; the reference wavelength is 587.2 μm; and the spectral region if 489.1–655.3 μm.)

APPENDIX II

| Parameter | Trioptiscope Lens (F/4.5, 32 mm) | Film Reflex Normal Lens (F/4.5, 32 mm) |
|---|---|---|
| 1. Camera Compatibility | 35 mm Mitchell BNC (non-reflex) | 35 mm Panaflex[a] |
|  |  | 35 mm Panavision Silent Reflex |
|  |  | 35 mm Mitchell S35R (MARK II) Reflex |
|  |  | 35 mm Mitchell BNCR |
|  |  | 35 mm Arriflex 2B |
|  |  | 35 mm Arriflex 2C |
|  |  | 16/35 mm Eclair CM-3 |
| 2. Effective Focal Length | 31.64 mm | 31.6 mm |
| 3. Focal Ratio - f/No | 4.5 | 4.5 |
| 4. T-Number - T/N[b] | 4.9 | 4.7 |
| 5. Linear Field of View | 22.05 mm × 9.53 mm[c] | 22.05 mm × 9.33 mm[d] |
| 6. Spectral Region | 486.1 μm to 656.3 μm | 486.1 μm to 656.3 μm |
| 7. Back Focal Distance | 27.65 mm | 35.91 mm |
| 8. Entrance Pupil Distance from First Lens Surface | 4.56 mm | 5.03 mm |
| 9. "First Lens Surface to Image Plane" Distance When Focused at Infinity | 34.69 mm | 48.16 mm |
| 10. "External Prism Front Face to Image Surface" Distance When Focused at Infinity | 139.81 mm | 121.01 mm |
| 11. Interocular Separation | 66.94 mm | 65.0 mm |
| 12. Total Optical Width Across Prisms From Outer Edge to Outer Edge | 130.0 mm | 108.3 mm |
| 13. Total Estimated Weight of External Prisms[e] | ~725 grams[f] | ~340 grams[g] |
| 14. Entrance Pupil Diameter | 7.03 mm | 7.02 mm |
|  |  | 172/65 |
| 15. Maximum Allowance Lens Clear Aperture | ≦9.53 mm | ≦9.33 mm |
| 16. Maximum Lens Clear Aperture | 7.0 mm | 8.5 mm |
| 17. Corner Distortion at 10 ft. | 0.07% | −0.5% |
| 18. Corner Relative Illumination at f/4.5 at 10 ft. | 46.3% | 48.9% |
| 19. Modulation Transfer Factor at 40 c/mm for Axis/Corner (R,T) |  |  |

-continued

| | APPENDIX II | |
|---|---|---|
| Parameter | Trioptiscope Lens (F/4.5, 32 mm) | Film Reflex Normal Lens (F/4.5, 32 mm) |
| at f/4.5 at 10 ft. | .46/(.59, .18) | .65/(.47, .48) |

[a]The camera compatibility of the wide angle, normal lens, and telephoto are the same.
[b]Assumes a single layer anti-reflection coating of magnesium fluoride at all air/glass transmitting surfaces.
[c]Not a standard 35 mm film gate aperture.
[d]The standard 35 mm Panavision film gate aperture, i.e., .868" × .735".
[e]In avoirdupois pounds the trioptiscope prisms weigh ~1.7 lb and the reflex prisms weigh ~0.75 lb.
[f]Based on dimensions given in Print #TL-D200.
[g]Based on the optical clear apertures and an unfolded prism volume.

| | APPENDIX III | | |
|---|---|---|---|
| Parameter | Wide Angle Lens (F/4.5 24 mm) | Normal Lens (F/4.5 32 mm) | Telephoto Lens (F/4.5 50 mm) |
| 1. Effective Focal Length | 24.0 mm | 31.6 mm | 50.0 mm |
| 2. Focal Ratio - F/No. | 4.5 | 4.5 | 4.5 |
| 3. T-Number-T/N | 4.7 | 4.7 | 4.8 |
| 4. Linear Field of View[b] | 22.05 mm × 9.33 mm | 22.05 mm × 9.33 mm | 22.05 mm × 9.33 mm |
| 5. Spectral Region | 486.1 μm to 656.3 μm | 486.1 μm to 656.3 μm | 486.1 μm to 656.3 μm |
| 6. Back Focal Distance | 29.79 mm | 35.91 mm | 30.57 mm[c] |
| 7. Entrance Pupil Distance from First Lens Surface | 4.76 mm | 5.03 mm | 8.54 mm |
| 8. "First Lens Surface to Image Plane" Distance When Focused at Infinity | 49.29 mm | 48.16 mm | 65.86 mm |
| 9. "External Prism Front Face to Image Surface" Distance When Focused at Infinity | 94.30 mm | 121.01 mm | 125.56 mm |
| 10. Interocular Separation | 50.0 mm | 65.0 mm | 102.0 mm |
| 11. Total Optical Width Across Prisms from Outer Edge to Outer Edge | 90.8 mm | 108.3 mm | 141.0 mm |
| 12. Total Estimated Weight of External Prisms | ~227 grams[e] | ~340 grams[e] | ~340 grams[e] |
| 13. Entrance Pupil Diameter | 5.33 mm | 7.03 mm | 11.11 mm |
| 14. Maximum Allowable Lens Clear Aperture | ≦9.33 mm | ≦9.33 mm | ~13.0 mm[f] |
| 15. Maximum Lens Clear Aperture | 8.52 mm | 8.50 mm | 10.56 mmf |
| 16. Corner Distortion at 10 ft. | −1.5% | −0.5% | −0.45% |
| 17. Corner Relative Illumination at F/4.5 at 10 ft | 50.4% | 48.9% | 52.6% |
| 18. Modulation Transfer Factor at 40c/mm for Axis/Corner (R,T), at F/4.5 | | | |

APPENDIX III -continued

| Parameter | Wide Angle Lens (F/4.5 24 mm) | Normal Lens (F/4.5 32 mm) | Telephoto Lens (F/4.5 50 mm) |
|---|---|---|---|
| at 10 ft. | .57/(.48,.41) | .65/(.47,.48) | .81/(.67,.72) |

[a] Assumes a single layer anti-reflection coating of magnesium fluoride at all air/glass transmitting surfaces.
[b] Standard 35 mm Panavision film gate aperture.
[c] Measured from internal prism to image.
[d] In avoirdupois pounds the weights are, respectively, ~.50 lb, ~0.75 lb and ~0.75 lb for the 24 mm, 32 mm and 50 mm systems.
[e] Based on the optical clear apertures and an unfolded prism volume.
[f] Last element of the telephoto lens system.

Thus, lens systems have been provided that provide high quality optical images, in conjunction with their use in three dimensional photography attachments to reflex motion picture cameras. Those skilled in the art will appreciate that the conception upon which this disclosure is based may be used as a basis for the designing of other structures, for carrying out the several purposes of the invention. The claims, therefore, should be regarded as including such equivalent constructions as do not depart from the spirit and scope of the invention, which is intended to be defined by the appended claims.

What is claimed is:

1. A three-dimensional optical system adapted for use with reflex cameras, comprising: two parallel and adjacent lens systems each having a sequence of a negative lens element followed by a triplet lens, whereby each of said lens systems gathers and focusses an image onto a focal plane independently of the other lens systems, the focal plane on which one said lens system gathers and focusses an image being the same as the focal plane on which the other said lens system gathers and focusses an image, and the images formed by the said two lens systems being adjacent on the said focal plane.

2. The optical system according to claim 1 in which the triplet lens has the following power arrangement: positive, negative, and positive.

3. A three-dimensional optical system adapted for use with reflex cameras, comprising: two parallel and adjacent lens systems each having a sequence of four powered lens elements in the following power arrangement: negative, positive, negative, and positive, whereby each of said lens systems gathers and focusses an image onto a focal plane independently of the other lens system, the focal plane on which one said lens system gathers and focusses an image being the same as the focal plane on which the other said lens system gathers and focusses an image, and the images formed by the said two lens systems being adjacent on the said focal plane.

4. The optical system of claim 3 in which the lens systems are wide angle lens systems which further comprise two plane parallel refractive elements, the first plane parallel refractive element being positioned between the first negative lens element and the first positive lens element, and the second plane parallel refractive element being located between the first positive lens element and the second negative lens element of each wide angle lens system.

5. The optical system of claim 3 in which the lens systems are telephoto lens systems which further comprise first and second internal displacement prisms, each of said prisms having an entrance face and an exit face, each of said prisms having a first reflecting surface for receiving rays from said entrance face and transmitting said rays backwardly and inwardly and a second reflecting surface for receiving said rays from said first reflecting surface and transmitting said rays backwardly through said exit face, each internal displacement prism having its entrance face immediately adjacent to a telephoto lens system on the side thereof opposite to the object, said internal displacement prisms collecting images formed by each telephoto lens system and transmitting said images backwardly and inwardly through the said prisms.

6. An optical system according to any of claims 3, 4 or 5 further comprising two external displacement prisms, each external displacement prism having an entrance face and an exit face, said external displacement prisms receiving right and left eye images at the entrance faces and transmitting said images backwardly and inwardly to its exit face positioned immediately adjacent one of said lens systems.

* * * * *